Sept. 15, 1925.
N. WILKINSON
SPEED CONTROLLING SYSTEM
Filed Feb. 17, 1921
1,553,582
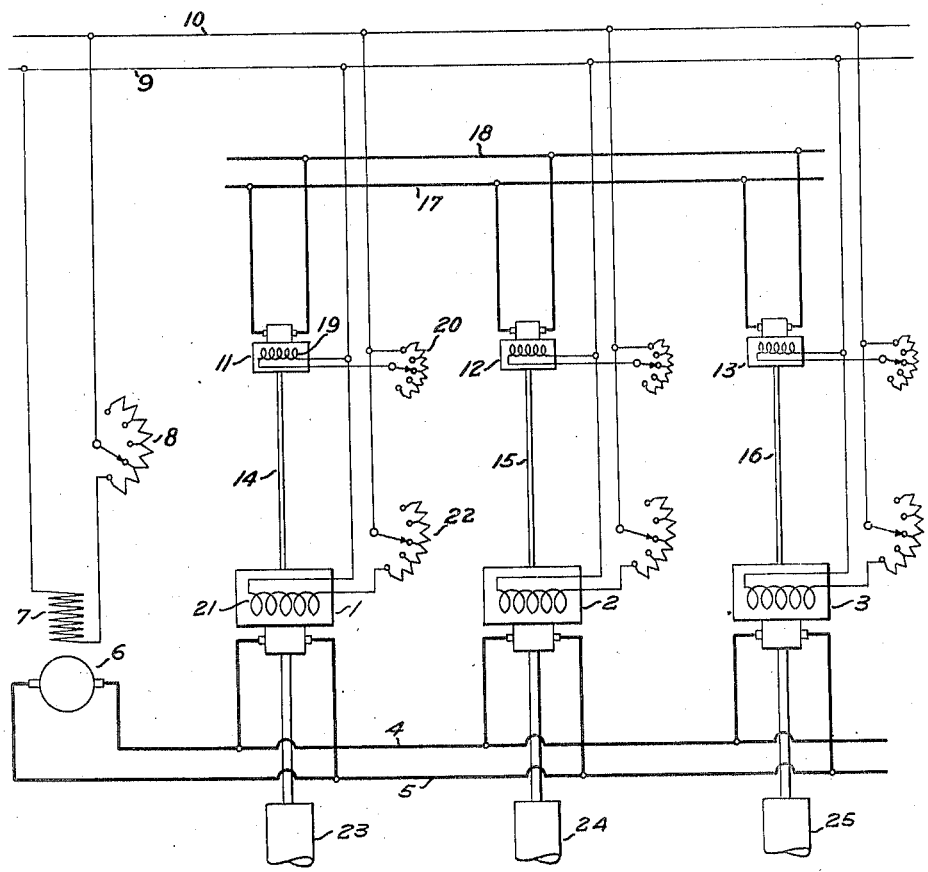
Inventor
N. Wilkinson
by
Attorney Patented Sept. 15, 1925.

1,553,582

UNITED STATES PATENT OFFICE.

NATHAN WILKINSON, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

SPEED-CONTROLLING SYSTEM.

Application filed February 17, 1921. Serial No. 445,763.

*To all whom it may concern:*

Be it known that NATHAN WILKINSON, a citizen of the United States, residing at Wauwatosa, in the county of Milwaukee and State of Wisconsin, has invented a certain new and useful Improvement in Speed-Controlling Systems, of which the following is a specification.

This invention relates to speed controlling systems and is particularly applicable for controlling two or more motors which motors may be applied to do the work of driving the rolls of a steel mill, paper mill, sugar mill, etc.

It is usual in connection with machinery driven by a plurality of motors, especially where the machinery acts upon a continuous piece of material, that it is desirable to keep the relative speeds of all of the motors substantially constant so that, for example, the material will not be stretched, or sag or be buckled between the various elements of the machinery. Accordingly, one of the objects of the invention is the provision of a system whereby the relative speeds of two or more motors may be kept substantially constant. Another object of the invention is the provision of a system of the character hereinbefore indicated, providing for the use of electro-responsive means for initiating a change in speed of any individual motor.

Still another object of the invention is the provision of a simple and efficient system whereby the foregoing results may be accomplished, and in line with this object a more specific object is the provision of a system in which mechanical speed-changing means is not necessary. Other objects will appear hereinafter as the description of the invention proceeds.

The novel features of the invention will appear from this specification and the accompanying drawing which forms a part thereof and shows one embodiment of invention, and all these novel features are intended to be pointed out in the claims.

The single figure of the drawing is a diagrammatic view illustrating a plurality of motors to which the system of control has been applied.

The main motors 1, 2, 3, to be controlled, are here shown as of the direct current type and connected in multiple to buses 4, 5 fed by a generator 6. The generator 6 is shown as provided with a field winding 7 connected in series with the rheostat 8 across exciter buses 9, 10.

A plurality of auxiliary dynamo-electric machines 11, 12, 13 here shown as of the direct current type are mechanically connected by means of the shafts 14, 15, 16 to the motors 1, 2, 3 respectively. The auxiliary dynamo-electric machines 11, 12, 13 are connected in multiple, each one being connected to the common buses 17, 18. Dynamo-electric machine 11 is provided with speed-changing means here shown as a winding 19 connected in series with a rheostat 20 and fed from the exciter buses 9, 10. The motor 1 is provided with speed-changing means, here shown as a field winding 21, connected in series with a rheostat 22 and may also be fed from the exciter buses 9, 10. Motors 2, 3 and dynamo-electric machines 12, 13 are similarly provided with speed-changing means and further description thereof by reference numerals is therefore necessary.

Motors 1, 2, 3 may be connected to drive any desired work represented by the rolls 23, 24, 25.

The operation of the system disclosed is as follows:

Assuming conditions to be normal, that is, that motors 1, 2, 3 are operating at the desired relative speeds and driving normal loads, the adjustment of the various elements of the system is such that the dynamo-electric machines 11, 12, 13 will neither deliver to, or take energy from the buses 17, 18, that is, they float on these buses. Assuming now that a load is put on motor 1 which is slightly above normal; the speed of motor 1 will therefore tend to drop but dynamo-electric machine 11 will immediately draw energy from buses 17, 18, and operate as a motor delivering power to the shaft of motor 1, thereby keeping its speed up, this energy being supplied by the machines 12, 13 running as generators. It is preferable that the load thus assumed by machine 11 be transferred to motor 1 so that all of the machines 11, 12, 13 will again float on the buses 17, 18. This may be done by cutting some of the resistance out of rheostat 22 thereby causing motor 1 to assume the added load in excess of normal. The proper point of adjustment may be readily determined, for example, by ammeters (not shown) in the leads between the machines 11, 12, 13 respectively and the buses 17, 18. Should the load on motor 1 become subnormal such motor would tend to speed up whereupon a corresponding load would immediately be put thereupon by machine 11 operating as a generator and delivering energy to the other machines 12, 13 through buses 17, 18. Analogous to the previously noted condition, machine 11 may be again caused to float on buses 17, 18 by cutting resistance into rheostat 22 thereby causing less electrical energy to be taken by motor 1 from the buses 4, 5. It will thus be apparent that if the speed of any one of the main motors tends to become supernormal or subnormal the change in load from normal will immediately be absorbed by its associated dynamo-electric machine, whereby the relative speeds of the motors is kept substantially constant.

If it is desired to change the relative speeds of the motors by changing the individual speed of any one of them, this may be accomplished in the following manner: For example, if it is desired to increase the speed of motor 1 the rheostat 20 may be adjusted to include more resistance whereupon machine 11 will operate as a motor drawing energy from machines 12, 13 operating as generators, thus driving motor 1 at a higher speed. As before, it is desirable to cause machine 11 to again float on buses 17, 18 and this may be accomplished by including more resistance in rheostat 22 whereupon motor 1 assumes the added load necessary to drive it at a higher speed, previously carried by machine 11. The analogous operations necessary to bring about a decrease of speed of motor 1 will be apparent to those skilled in the art.

The speed of motor 1 may also be deliberately changed by first adjusting rheostat 22 in the desired direction and then adjusting rheostat 20 to cause machines 11, 12, 13 to again float on the buses 17, 18.

By reason of the fact that speed adjustments are secured electro-responsively, the disclosed system lends itself readily to control from a distance, and if desired, all of the speed-changing means may be located at a single station.

It should be understood that it is not desired to limit the invention claimed to the exact details of construction herein shown and described, for obvious modifications may occur to persons skilled in the art.

It is claimed and desired to secure by Letters Patent:

1. In combination, a plurality of direct current motors fed from a common source, means for maintaining a constant selected speed relation between said motors comprising a plurality of direct current dynamo-electric machines mechanically associated with said motors, one for each of said motors, means for connecting said dynamo-electric machines in multiple, to each other only, and means for changing said selected relation comprising a field winding for each of said motors and machines, and independently operable means for varying the current through each of said windings.

2. In combination, a plurality of electric motors, means for supplying said motors with energy, means for maintaining a constant selected speed relation between said motors comprising a plurality of variable speed dynamo-electric machines mechanically associated with said motors, one for each of said motors, means for connecting said dynamo-electric machines in multiple, to each other only, and means for changing said selected relation comprising means for independently varying the speed of said motors, a field winding for each of said machines, and means for varying the current through each of said field windings independently.

3. In combination, a plurality of electric motors, means for supplying said motors with energy, means for maintaining a constant selected speed relation between said motors comprising a plurality of dynamo-electric machines directly connected to said motors, one for each of said motors, means for connecting said dynamo-electric machines in multiple, to each other only, and independently adjustable means for adjusting the speed at which each of said motors and machines tends to run.

4. In combination, a plurality of motors, means for supplying said motors with energy, means for maintaining a constant selected speed relation between said motors comprising a plurality of dynamo-electric machines directly connected to said motors, one for each of said motors, means whereby a change in load from normal on one of said motors will be absorbed by its associated dynamo-electric machine, and means for changing said selected relation and whereby the load on said associated dynamo-electric machine may be reduced to substantially zero for any said selected relation.

5. In combination, a plurality of electric motors, mechanism, connected to each motor, adapted to operate on a continuous piece of material, means for varying the field strength of said motors, means for causing said motors to run at any selected one of different speed ratios and for maintaining said selected ratio comprising means for distributing and delivering an excess of energy produced by any motor tending to run at a supernormal speed to the other motors and for supplying energy to a motor from said other motors when it tends to run at a subnormal speed, and electrical remote control means whereby said distributing and delivering means may be controlled to reduce to zero the energy transmitted for any selected speed ratio.

6. In combination, a plurality of electric motors, mechanism, connected to each motor, adapted to operate on a continuous piece of material, means for causing said motors to run at any selected one of different speed ratios and for maintaining said selected ratio comprising a plurality of dynamo electric machines directly connected to said motors, one for each of said motors, means for connecting said dynamo electric machines in multiple, to each other only, and means whereby the load on said dynamo electric machines may be reduced to substantially zero at any selected speed ratio.

In testimony whereof, the signature of the inventor is affixed hereto.

NATHAN WILKINSON.